United States Patent Office 2,983,686
Patented May 9, 1961

2,983,686
FLUORESCENT FOILS

Roderich Konig, Riehen, near Basel, and Karl Keller, Basel, Switzerland, assignors to J. R. Geigy A.-G., Basel, Switzerland, a Swiss firm No Drawing. Filed Oct. 1, 1956, Ser. No. 612,944

Claims priority, application Switzerland Oct. 7, 1955

9 Claims. (Cl. 252—301.2)

The invention is concerned with fluorescent foils made up from polymeric synthetic materials and processes for the production thereof.

The incorporation of optical brightening agents, i.e. more or less colourless substances which absorb ultraviolet light and emit violet to blue light, into acetyl cellulose or gelatine foils is known. The purpose of such additives up to now has been either to optically brighten the treated foils in daylight by making use of the blue fluorescence or to protect goods wrapped in such foils from the often injurious U.V. rays.

It has now been found that foils made up from polymeric synthetic materials can be given a very vivid fluorescence if contents of 0.1 to 1%, calculated on the total weight, of organically soluble optical brightening agents and, in addition, amounts of 0.001 to 0.5% of non-fluorescent dyestuffs which are insoluble in water, are incorporated therein.

The fluorescence lent, according to the present invention, to the foils and, in particular, to the more or less transparent foils made up from polymeric synthetic materials, is, surprisingly, considerably more intensive than that attained when no dyestuff which is insoluble in water is present. Also, foils produced according to the present invention have a very desirable shot effect.

Examples of foils made up from polymeric synthetic material in the sense of the invention are flat sheets or strips, which, for example are produced from polyvinyl chloride, polyethylene, polystyrol etc. and which contain the usual plasticisers, e.g. dialkyl phthalates, dialkyl adipates, dialkyl sebacates, triaryl phosphates etc. The term "organically soluble optical brightening agent" embraces the most different types of practically colourless to at most slightly yellow coloured organic substances which, either as such or in adsorbed or dissolved condition, have the property of absorbing U.V. light and emitting a violet to blue fluorescence light so that on more or less colourless carriers they produce a brightening effect in daylight by optical compensation of the yellowish colour of the carrier. The term "organically soluble" is intended to stress that the sulphonated optical brightening agents usual in the textile and soap and detergent industries are excluded because they are ineffective. Optical brightening agents usable according to the present invention are known from the most various classes of compounds; examples are: 4.5-diphenyl-dihydroimidazole-2-one, 1.3-diaryl- and 1.3.5-triaryl pyrazolines, 7-aminocoumarines, bis - benzimidazolyl-(2)-ethylenes, oxacyanines, styryl oxadiazoles, 4-styryl-1-phenyl pyrazolines etc. However, those organically soluble optical brightening agents which are derived from stilbene-2-sulphonic acids and are obtained by modification of the sulphonic acid to sulphamide and, preferably, to sulphonic acidaryl ester groups, have proved to be of particular value in the process according to the present invention. Of such stilbene compounds, the 4-[arylo-1.2.3-triazolyl-(2)]-stilbene-2- or 2'-sulphonic acid derivatives, in particular the 4-[(naphtho-1'.2':4.5)-1.2.3-triazolyl-(2)]-stilbene-2- or -2'-sulphonic acid amides and sulphonic acid aryl esters, e.g. the phenol cresol or xylenol ester are particularly suitable for the process according to the present invention. According to the intensity of fluorescence and the desired effect, the organically soluble brightening agents are used in amounts of 0.1 to 1%, calculated on the total weight of the synthetic material. The brightening agents are incorporated either by mixing the pulverulent starting materials before working up into foils or by applying solutions of brightening agents usable according to the present invention to plasticisers such as are usually used in the production of foils for example from polyvinyl chloride powder.

The water insoluble and non-fluorescent dyestuffs which are also to be incorporated according to the present invention, can belong to the most various classes of dyestuffs. Chiefly the so-called dye lakes are used, e.g. water insoluble salts from o-sulphonic acid phenyl azo compounds and earth alkali metal salts such as the barium, strontium or calcium salts, or heavy metal salts such as, e.g. the manganese salt; also water insoluble dye pigments such as the azo pigments or halogen-free or halogenated phthalocyanines and the heavy metal complexes thereof, e.g. the complex Cu-, Co- or Ni-compounds. Also coloured inorganic pigments can be used, e.g. chromium yellow, cadmium red or chromic oxide green. These dyestuffs, in finely distributed powder form, are mixed into the starting materials before forming into foils. With certain polymeric synthetic materials, such as, e.g. the polystyroles, also the so-called dyestuffs which are soluble in fat can be used with advantage, e.g. fat red from diazotised p-aminobenzenes and 2-naphthol.

The ratio of content of optical brightening agents to the content of water insoluble dyestuffs in the fluorescent synthetic foils according to the present invention should, in general, be more than 1 and, advantageously 10 or more.

Due to their new effects, the fluorescent foils and strips according to the present invention can be used, for example, in the clothing industry. Here they often have the advantage that they allow the colour of the materials they protect to be much more clearly seen than is the case with foils not having the additives according to the present invention. They can also be used for decorative purposes and as packing material as well as for rain coats.

The following examples illustrate the invention. Where not otherwise stated, parts are given as parts by weight. The temperatures are in degrees centigrade. The relationship of parts by weight to parts by volume is as that of kilogrammes to litres.

EXAMPLE 1

65 parts of polyvinyl chloride powder are mixed with 32 parts of dioctyl phthalate, 2 parts of dibutyl tin dilaurate, 0.2 part of the disazo dyestuff pigment from 2 mols of diazotised 2.4-dichloraniline and 1 mol of 4.4'-bis-acetoacetylamino-3.3'-dimethyl diphenyl as yellow pigment and 0.8 part of the optical brightening agent 4.4'-bis-[(1'.2':4.5-naphtho) - 1.2.3 - triazoyl-(2)] - stilbene-2.2'-bis-sulphonic acid dibutylamide. The components are heated on a set of mixing rollers in the usual way to about 150° and the mass is then drawn out into foils of about 0.2 mm. thickness. A yellow transparent polyvinyl chloride foil is obtained which has a very beautiful blue fluorescence and which can be worked up into rain coats having a green-blue shot effect.

EXAMPLE 2

66 parts of polyvinyl chloride powder, 32 parts of dioctyl sebacate, 2 parts of dibutyl tin dilaurate, 0.001 part of manganese lacquer of the monoazo dyestuff 2- chloro-4-amino-1-methylbenzene-5-sulphonic acid→2.3-hydroxynaphthoic acid as red pigment and 0.1 part of the optical brightening agent 4-[(1'.2':4.5-naphtho)-1.2.3-triazolyl-(2)]-stilbene-2-sulphonic acid cyclohexylamide are mixed on a set of mixing rollers at about 150° and the mass is drawn out into foils of 0.1–0.2 mm. thickness. A strongly fluorescent, transparent, reddish foil is obtained which can be used for rain coats or as packing material for red fruit.

EXAMPLE 3

66 parts of polyvinyl chloride powder, 32 parts of triphenyl phosphate, 2 parts of dibutyl tin dilaurate, 0.01 part of finely ground β-Cu-phthalocyanine as blue pigment and 0.3 part of the optical brightening agent 4 - [(1'.2':4.5 - naphtho)-1.2.3-triazolyl-(2)]-stilbene-2-sulphonic acid phenol ester are mixed on a set of mixing rollers at 150° and the melt is drawn out into foils of 0.2 mm. thickness. A foil with a strong blue fluorescence is obtained which can be used for the production of rain coats or as packing material for blue fruit.

A green foil which has a blue fluorescence is obtained if 0.05 part of highly chlorinated Cu-phthalocyanine is used as dye-stuff and 0.3 part of the brightening agent named in Example 1 is used.

EXAMPLE 4

100 parts of polyethylene are mixed on a set of mixing rollers at about 110° with the following additives and then pressed into sheets or foils:

0.02 part of the most finely ground, highly chlorinated Cu-phthalocyanine as green pigment, 0.03 part of dioctyl phthalate, 0.20 part of 1.4 bis-[(naphtho-1'.2':4.5)-1.2.3-triazolyl-(2)]-stilbene-2.2'-bis-sulphonic acid dibutylamide.

Green sheets or foils having a blue fluorescence are obtained. The sheets can be worked up into household articles or packing materials.

EXAMPLE 5

100 parts of polystyrol powder, 0.01 part of the blue-red calcium lake of the monoazo diestuff 4-amino-1-methylbenzene-3-sulphonic acid→2.3-hydroxy-naphthoic acid and 0.1 part of 4-[(naphtho-1'.2':4.5)-1.2.3-triazolyl-(2)]-stilbene-2-sulphonic acid-(2.4-dimethyl phenyl ester) are homogeneously mixed on a set of mixing rollers at 90° and then the mass is pressed into sheets at 180°. Red sheets having a blue fluorescence with a beautiful shot effect are obtained which are suitable, for example, for advertising samples or combs and such like.

Similar effects are obtained by using 4-[(naphtho-1'.2':4.5) - 1.2.3-triazolyl-(2)]-stilbene-2-sulphonic acid cyclohexylamide as brightening agent.

Also 0.002 part of the diazo dyestuff 4-amino azobenzene→2-naphthol can be used instead of the calcium lake used in this example.

EXAMPLE 6

If 0.3 part of chrome yellow (lead chromate) is used instead of the 0.2 part of the disazo dyestuff named in Example 1, then yellow, transparent polyvinyl chloride foils having a beautiful blue fluorescence are obtained in the manner described in that example.

EXAMPLE 7

If, in Example 2, 0.05 part of cadmium red (cadmium sulphide+cadmium selenide) is used instead of the manganese lake of an azo dyestuff used in that example, then transparent, reddish polyvinyl chloride foils having a beautiful blue fluorescence are obtained. A similar effect is attained on using 0.5 part of the optical brightening agent used in Example 2 and 0.5 part of cadmium red.

EXAMPLE 8

If 0.05 part of chrome oxide green ($Cr_2O_3$) is used instead of the chlorinated Cu-phthalocyanine mentioned in Example 4, then a greenish foil having a strong blue fluorescence is also obtained in the manner described in that example.

The following table contains further examples of synthetic foils produced according to the present invention:

Table

| Example | Brightening agent | Synthetic substance | Dyestuff of example | Shot effect |
|---|---|---|---|---|
| 9 | 0.1% 3.3'.5.5'-tetramethyloxacyanine methosulphate. | PVC | 2/0.001% | ruby-violet. |
| 10 | 0.1% bis-(benzimidazolyl-2)-ethylene | PVC | 2/0.001% | Do. |
| 11 | do | PVC | 5/0.001% | green-blue. |
| 12 | 0.1% bis - (4'.5' - diphenylfurano - 2'.3')-benzene. | PVC | 2/0.001% | red-violet. |
| 13 | do | PVC | 5/0.001% | blue-violet. |
| 14 | 0.1% 1.4- bis- (4'-laurolyamino-2'-phenyl sulphonylstyryl)-benzene. | PVC | 5, 2nd para. 0.001% | green-blue/yellow-green. |
| 15 | do | PVC | 2/0.001% | yellow/green-blue. |
| 16 | 0.1% 7-enthylamino-4-methylcoumarin | PVC | 2/0.001% | ruby-violet. |
| 17 | 0.1% 1,3-diphenyl pyrazoline | PVC | 2/0.001% | red-violet. |
| 18 | 0.1% 1-phenyl-3-(4' -methoxystyryl)-5-(4'-methoxyphenyl)-pyrazoline. | PVC | 5, 2nd para. 0.001% | yellow-green/green-blue. |

What we claim is:

1. A composition of matter in the form of fluorescent foils and plates which consists essentially of a member selected from the group consisting of polyvinyl chloride, polyethylene and polystyrene, of 0.1 to 1.0 percent by weight of a substantially colourless organic soluble fluorescent stilbene compound which contains in at least one p-position relative to the vinylene bridge a 4.5-arylene-1.2.3-triazole-2-yl substituent and of 0.001 to 0.5 percent of a water insoluble pigment dye, the ratio of fluorescent compound to water insoluble pigment dye being greater than 1.

2. A composition of matter in the form of fluorescent foils and plates which consists essentially of a member selected from the group consisting of polyvinyl chloride, polyethylene and polystyrene, of 0.1 to 1.0 percent by weight of a substantially colourless organic soluble fluorescent stilbene compound which contains in at least one p-position relative to the vinylene bridge a 4.5-naphthylene-1.2.3-triazole-2-yl substituent and of 0.001 to 0.5 percent of a water insoluble pigment dye, the ratio of fluorescent compound to water insoluble pigment dye being greater than 1.

3. A composition of matter in the form of fluorescent foils and plates which consists essentially of a member selected from the group consisting of polyvinyl chloride, polyethylene and polystyrene, of 0.1 to 1.0 percent by weight of a substantially colourless organic soluble fluorescent stilbene compound which contains in at least one p-position relative to the vinylene bridge a 4.5-naphthylene-1,2,3-triazole-2-yl substituent and in at least one o-posiiton relative to the vinylene bridge a negative substituent and of 0.001 to 0.5 precent of a water insoluble pigment dye, the ratio of fluorescent compound to water insoluble pigment dye being greater than 1.

4. A composition of matter in the form of fluorescent foils and plates which consists essentially of a member selected from the group consisting of polyvinyl chloride, polyethylene and polystyrene, of 0.1 to 1.0 percent by weight of a substantially colourless organic soluble fluorescent stilbene compound which contains in at least one p-position relative to the vinylene bridge a 4.5-naphthylene-1.2.3-triazole-2-yl substituent and in at least one o-position to the vinylene bridge a sulfonyl substituent selected from the group consisting of sulfonic acid amide and sulfonic acid phenyl ester radicals, and of 0.001 to 0.5 percent of a water insoluble pigment dye, the ratio of fluorescent compound to water insoluble pigment dye being greater than 1.

5. A composition of matter in the form of fluorescent foils which consist essentially of polyvinyl chloride, of a neutral polyacid ester plasticiser, of 0.1 to 1.0 percent by weight of 4.4'-bis-[(naphhto-1'.2':4.5)-1.2.3-triazolyl-2]-stilbene-2.2'-disulphonic acid dibutylamide and of 0.001 to 0.5 percent by weight of a disazo dye pigment from 2 mols of a diazo-dichlorobenzene compound and 1 mol of 4.4'-bis-acetoacetylamino-3.3'-dimethyl diphenyl, the ratio of said dibutylamide to said disazo dye pigment being greater than 1.

6. A composition of matter in the form of fluorescent foils which consists essentially of polyvinyl chloride, of a neutral polyacid plasticiser, of 0.1 to 1.0 percent by weight of 4-[(1'.2':4.5-naphtho)-1.2.3-triazolyl-2]-stilbene-2-sulphonic acid cyclohexylamide and of 0.001 to 0.5 percent by weight of the manganese lake of the monoazo dyestuff 2-chloro-4-diazo-1-methylbenzene-5-sulphonic acid→2.3-hydroxynaphthoic acid, the ratio of said cyclohexylamide to said manganese lake being greater than 1.

7. A composition of matter in the form of fluorescent foils which consists essentially of polyvinyl chloride, of a neutral polyacid ester plasticiser, of 0.1 to 1.0 percent by weight of 4-[(1'.2':4.5-naphtho)-1.2.3-triazolyl-2]-stilbene-2-sulphonic acid phenol ester and of 0.001 to 0.5 percent by weight of copper phthalocyanine, the ratio of said phenol ester to said phthalocyanine being greater than 1.

8. A composition of matter in the form of fluorescent foils which consists essentially of polyethylene, of a neutral polyacid ester plasticiser, of 0.1 to 1.0 percent by weight of 1.4-bis-[(naphtho-1'.2':4.5)-1.2.3-triazolyl-2]-stilbene-2.2'-disulphonic acid dibutylamide and of 0.001 to 0.5 percent by weight of chlorinated copper phthalocyanine, the ratio of said dibutylamide to said phthalocyanine being greater than 1.

9. A compositoin of matter in the form of fluorescent plates which consists essentially of polystyrene, of 0.1 to 1.0 percent by weight of 4-[(naphhto-1'.2':4.5)-1.2.3-triazolyl-2]-stilbene-2-sulphonic acid 2.4-dimethylphenyl ester and of 0.001 to 0.5 percent by weight of the calcium lake of the monoazo dyestuff 4-diazo-1-methylbenzene-3-sulphonic acid→2.3-hydroxynaphthoic acid, the ratio of said ester to said calcium lake being greater than 1.

References Cited in the file of this patent

UNITED STATES PATENTS

| | | |
|---|---|---|
| 2,215,196 | Schlack | Sept. 17, 1940 |
| 2,341,009 | Axelrad | Feb. 8, 1944 |
| 2,397,751 | Rand | Apr. 2, 1946 |
| 2,784,184 | Zweidler | Mar. 5, 1957 |
| 2,844,594 | Long | July 22, 1958 |

FOREIGN PATENTS

| | | |
|---|---|---|
| 560,143 | Great Britain | Mar. 22, 1944 |
| 566,810 | Great Britain | Jan. 15, 1945 |

OTHER REFERENCES

Sanders: Abstract of application Serial No. 791,145, publ. in 669 O.G. 920, 921 (April 21, 1953).